March 8, 1932.　　　C. AALBORG　　　1,848,298

SYNCHRONOUS CONTROL FOR CIRCUIT BREAKERS

Original Filed Aug. 9, 1924

WITNESSES:

INVENTOR
Christian Aalborg
BY
ATTORNEY

Patented Mar. 8, 1932

1,848,298

UNITED STATES PATENT OFFICE

CHRISTIAN AALBORG, OF PITTSBURGH, PENNSYLVANIA, ASSIGNOR TO WESTINGHOUSE ELECTRIC & MANUFACTURING COMPANY, A CORPORATION OF PENNSYLVANIA

SYNCHRONOUS CONTROL FOR CIRCUIT BREAKERS

Application filed August 9, 1924, Serial No. 731,102. Renewed January 31, 1930.

My invention relates to alternating-current electrical-distribution systems and particularly to circuit interrupters therefor.

One object of my invention is to provide a circuit interrupter that shall operate when the voltage of the connected alternating-current circuit is approximately zero.

Another object of my invention is to provide a circuit interrupter in which the energizing current therefor is supplied in pulsations that bear a definite relation to the voltage waves in the protected circuit.

It has been found that the difficulties attendant upon the interruption of high-tension transmission line are materially reduced if it is possible to operate the contact members of the circuit interrupter at a time when the voltage of the circuit to be interrupted is substantially zero. When the circuit is opened with the voltage at substantially zero, the amount of the arc generated is small and the chances of arc reignition across the contact members are eliminated.

The purpose of the present invention is to insure that the circuit interrupter shall open at the time the voltage wave in the alternating system is substantially zero.

In the accompanying drawings.

Figure 1:
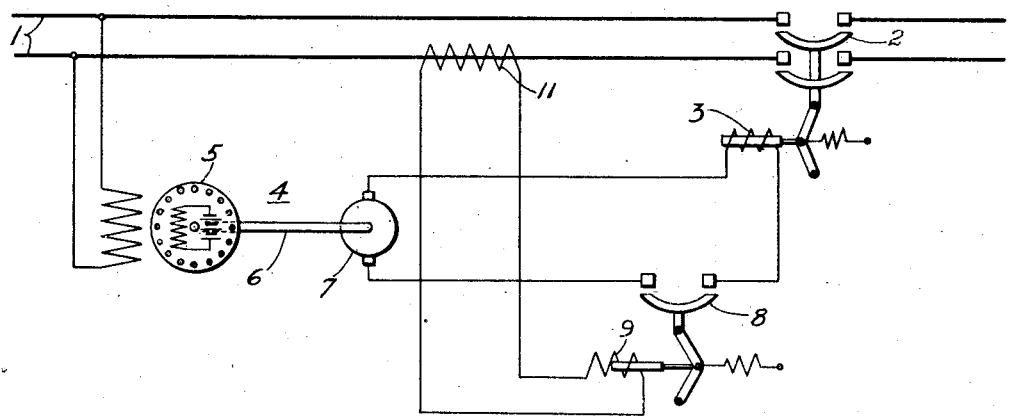
Figure 1 is a diagrammatic view of circuits and apparatus embodying my invention.

My invention comprises, in general, an alternating-current circuit 1 that is protected by a circuit interrupter 2 having a trip coil 3 that is provided with pulsating energy by a motor-generator set 4 of special construction.

The motor-generator set 4 comprises a single-phase squirrel-cage motor 5 that is directly coupled, by a shaft 6 or an equivalent means, to a generator 7 that delivers a pulsating current. The generator 7 is connected to the trip coil 3 through a circuit interrupter 8 having a closing coil 9. The closing coil 9 is energized from a current transformer 11 connected to one of the conductors of the circuit 1. The transformer 11 and closing coil 9 of the circuit interrupter 8 together act as an overload relay for closing the circuit interrupter 8 and thereby connecting the trip coil 3 and generator 7 upon the occurrence of overload or short-circuit conditions in the circuit 1.

Figure 2:
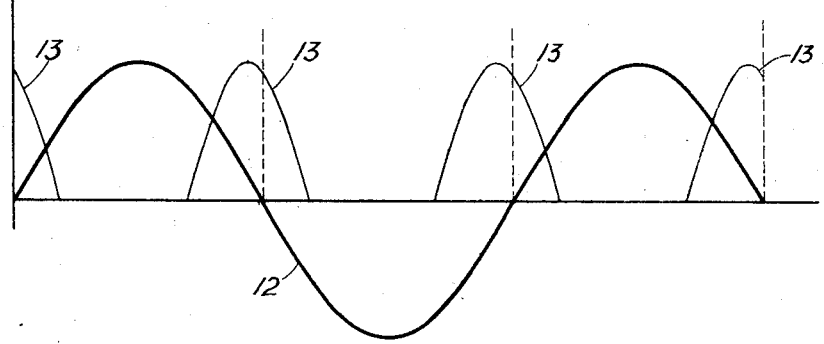
Fig. 2 is a curve showing the relationship between the voltage wave in the distribution system and the current supplied to the tripping coil of the circuit interrupter.

The generator 7, being directly connected to the motor 5, rotates in step with the voltage sine curve 12 of the circuit 1 but is so wound that the current delivered is in the form of impulses, shown at 13 in Fig. 2. These impulses are so timed that each reaches its crest slightly in advance of the time at which the sine wave 12 passes through its zero point. While I have shown the current waves 13 as being delivered during each half-cycle of the sine wave 12, it is obvious that the generator 7 may be so wound as to deliver current only on alternate cycles or only once in each of different cycles, as desired.

Upon the occurrence of an overload or short-circuit condition in the circuit 1, the current transformer 11 is increasingly energized, thereby causing the closing coil 9 to actuate the circuit interrupter 8 to its closed position. Upon the closing of the circuit interrupter 8, the trip coil 3 and the generator 7 are connected in circuit with each other, and the trip coil 3 becomes energized in accordance with the current delivered by the generator 7. Since the generator 7 is constantly in step with the motor 6, the relation between the sine wave 12 of the transmission line 1 and the impulses 13 of the generator 7 immediately becomes that shown in Fig. 2.

So soon as the sine wave 12 approaches a point of zero potential, the current delivered to the tripping coil 3 approaches a maximum, and the circuit interrupter 2 is accordingly opened at approximately the time that the voltage wave 12 passes through the zero point. It is to be noted that the crests of the waves 13 are slightly in advance of the zero points of the wave 12. This is to compensate for the mechanical delay in the operation of the trip coil 3 and the circuit interrupter 2.

Accordingly, I have provided a circuit interrupter that insures that the circuit under control will be operated when its voltage wave is substantially of zero value and the dangers of arc re-ignition and development of large quantities of arc gases are avoided.

The structural parts of the circuit interrupter are so designed that the contact members separate with sufficient rapidity to insert an insulating medium therebetween before the voltage current can again build up to its maximum. However, the structural details of such circuit interrupters do not pertain to the present invention except insofar as such details are necessary to successful operation.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. The combination with an alternating-current circuit and a circuit interrupter having a tripping coil, of means for impressing a voltage on the tripping coil at a predetermined point of the cycle of the voltage of the said circuit.

2. The combination with an alternating-current circuit and a circuit interrupter having a tripping coil, of means for supplying the tripping coil with a current wave bearing a definite time relation to the voltage wave of the said circuit.

3. The combination with an alternating-current circuit and a circuit interrupter having a tripping coil, of means for supplying the tripping coil with current having such a wave form that the crest of said wave bears a definite relation to the zero points of the voltage wave of the current.

4. The combination with an alternating-current circuit and a circuit interrupter having a tripping coil, of means for supplying the tripping coil with current having such a wave form that the crest thereof slightly precedes the zero points of the voltage wave of the circuit.

5. The combination with an alternating-current circuit and a circuit interrupter having a tripping coil, of means synchronized with the voltage wave in the alternating-current circuit for operating the tripping coil.

6. The combination with an alternating-current circuit and a circuit interrupter having a tripping coil, of a motor-generator synchronized with the voltage wave in the alternating-current circuit for operating the tripping coil.

7. The combination with an alternating-current circuit and a circuit interrupter having a tripping coil, of a motor-generator synchronized with the voltage wave in the alternating-current circuit for supplying a pulsating current to the tripping coil.

8. The combination with an alternating-current circuit and a circuit interrupter having a tripping coil, of a motor-generator synchronized with the voltage wave in the alternating-current circuit for supplying a pulsating current to the tripping coil such that the period of the maximum influence of the current on the tripping coil occurs in a predetermined timed relation to a period of zero voltage in the alternating-current circuit.

9. The combination with an alternating-current circuit and a circuit interrupter having a tripping coil, of a synchronous motor connected to the alternating-current circuit and a generator driven by the motor for supplying electrical energy to the tripping coil.

10. The combination with an alternating-current circuit and a circuit interrupter having a tripping coil, of a synchronous motor connected to the alternating-current circuit and a generator driven by the motor, the generator having a winding for supplying a pulsating current to the tripping coil.

11. The combination with an alternating-current circuit and a circuit interrupter having a tripping coil, of a synchronous motor connected to the alternating-current circuit and a generator driven by the motor, the generator having a winding for supplying a pulsating current to the tripping coil whereby the tripping coil is energized in a predetermined relation to the voltage wave of the alternating-current circuit.

12. The combination with an alternating-current circuit and a circuit interrupter having a tripping coil, of a synchronous motor connected to the alternating-current circuit and a generator driven by the motor, the generator having a winding for supplying a pulsating current to the tripping coil whereby the tripping coil is energized in a definite relation to the voltage wave traversing the alternating-current circuit.

13. The combination with a circuit interrupter for alternating-current circuits, of a separate circuit for operating the circuit interrupter and means for producing energy pulsations in said separate circuit that bear a definite relation to the voltage wave of the alternating-current circuit.

14. The combination with an alternating-current circuit and a circuit interrupter having an operating winding associated therewith, of a separate circuit for energizing said winding and means for producing pulsations in said separate circuit that have a predetermined relation to the voltage wave of the alternating-current circuit.

15. The combination with an alternating-current circuit and a circuit interrupter having an operating winding associated therewith, of a separate source of pulsating energy for energizing said winding and means for causing said pulsations to have a definite relation to the voltage wave of the alternating-current circuit.

In testimony whereof, I have hereunto subscribed my name this 2nd day of August, 1924.

CHRISTIAN AALBORG.